United States Patent

Sanders et al.

[11] Patent Number: 5,893,024
[45] Date of Patent: Apr. 6, 1999

[54] DATA COMMUNICATION APPARATUS AND METHOD THEREOF

[75] Inventors: Stuart Sanders, Lindenhurst; Dennis Michael Allen, Woodstock; Gary E. Mastenbrook, Schaumburg, all of Ill.

[73] Assignee: Motorola, Inc., Schaumburg, Ill.

[21] Appl. No.: 696,082

[22] Filed: Aug. 13, 1996

[51] Int. Cl.⁶ .................................................. H04N 7/173
[52] U.S. Cl. .............................................. 455/5.1; 348/12
[58] Field of Search .......................... 455/4.2, 5.1, 6.1, 455/6.2, 3.1, 6.3; 348/12, 10, 13

[56] References Cited

U.S. PATENT DOCUMENTS

| | | | |
|---|---|---|---|
| 3,750,022 | 7/1973 | Curry et al. | 455/6.1 |
| 3,775,691 | 11/1973 | Merrel | 455/6.1 |
| 3,924,187 | 12/1975 | Dormans | 455/4.2 |
| 3,987,398 | 10/1976 | Fung | 455/4.2 |
| 4,311,974 | 1/1982 | Reddy | 455/4.2 |
| 4,509,073 | 4/1985 | Baran et al. | 455/5.1 |
| 4,752,954 | 6/1988 | Masuko | 455/6.1 |
| 4,810,898 | 3/1989 | Rocci et al. | 455/4.2 |
| 4,982,440 | 1/1991 | Dufresne et al. | 455/4.2 |
| 5,317,392 | 5/1994 | Ishibashi et al. | 455/5.1 |
| 5,387,927 | 2/1995 | Look et al. | 455/4.2 |
| 5,488,412 | 1/1996 | Majeti et al. | 455/5.1 |
| 5,534,913 | 7/1996 | Majeti et al. | 455/5.1 |

*Primary Examiner*—Chris Grant
*Attorney, Agent, or Firm*—Gregory B. Gulliver

[57] ABSTRACT

A method and apparatus for reducing ingress noise (304) in the upstream frequency band and reducing power consumption in a cable communication system (200) by not allowing signals generated in the customer premise (104) to enter the upstream frequency band on the cable network (110) unless a customer premise device (102) is attempting to establish a communication link. An RF detector (206) monitors the signals on the coaxial cable for an RF signal. The comparator (208) indicates to the logic circuit (210) when the RF signal has exceeded a minimum threshold. The logic circuit (210) determines if the subscriber premise device (102) is attempting to establish a communication link. If the subscriber premise device (102) is transmitting the logic circuit (210) closes the ingress switch (212) to connect the subscriber premise device (102) to the network.

19 Claims, 6 Drawing Sheets

DATA COMMUNICATION APPARATUS AND METHOD THEREOF

BACKGROUND

The present invention relates, in general, to cable communication systems, and more particularly to cable data communication systems.

Cable communication systems are being designed to handle a wide variety of services including telephony, video and data. One method of integrating these services is by using a system similar to cable television systems. The cable network consists of several cables, splitters, combiners and amplifiers. A plurality of customer premise devices such as televisions, computers, set top boxes and modems are typically connected to a cable network through a single coaxial cable routed throughout the customer premise. The connection is made to the cable network through a cable access unit which is typically mounted on the outside of the customer premise. Other customer premise equipment such as telephones and FAX machines may be connected to the cable access unit through other types of cabling such as twisted pair wiring.

Typically, a frequency band is chosen for upstream transmissions (transmissions from the customer premise to the network) which is different from the frequency band for downstream transmissions (transmissions from the network into the customer premise).

Poor connections, faulty cables, and noise from customer premise devices introduced in the upstream frequency band contribute to ingress noise in the cable network. Faulty connections and broken cables couple radio signals and noise into the cable network. In addition, customer premise devices may introduce noise generated in the customer premise device into the cable network. Local oscillators and phase lock loops, for example, may generate harmonics in the upstream frequency band and be a source of ingress noise.

Since the customer is responsible for the cabling inside the customer premise, the service provider typically cannot control or predict the quality and condition of the cabling and customer premise devices in the customer premise. Noise in the upstream frequency band cannot be eliminated by simple filtering since the frequency at which the noise occurs cannot be predicted and since the noise will likely occur in a channel that is being used for upstream communication and, therefore, cannot not be attenuated. Ingress noise becomes more problematic as the number of customers on the cable network increases.

Typical cable communication systems power the subscriber cable access units from the network through the cable. This allows for the system to operate when power is not available through the subscriber premise. Although the power consumption of each individual cable access unit may not be large, the combined power requirements on the network are significant. A slight reduction of power consumption of each cable access unit can greatly reduce the demand on the system.

Therefore, there exists a need for a method and device for reducing the level of ingress noise and reducing power consumption in a cable communication system.

DETAILED DESCRIPTION OF THE DRAWINGS

The present invention provides a method and apparatus for reducing ingress noise in a cable communication system and for controlling power consumption in a cable communication system. The level of ingress noise in a cable communication system is reduced by making an upstream connection only when a customer premise device is transmitting onto the cable. In addition, circuits needed only when a customer premise device is transmitting are turned on when the customer premise device is transmitting.

Figure 1:
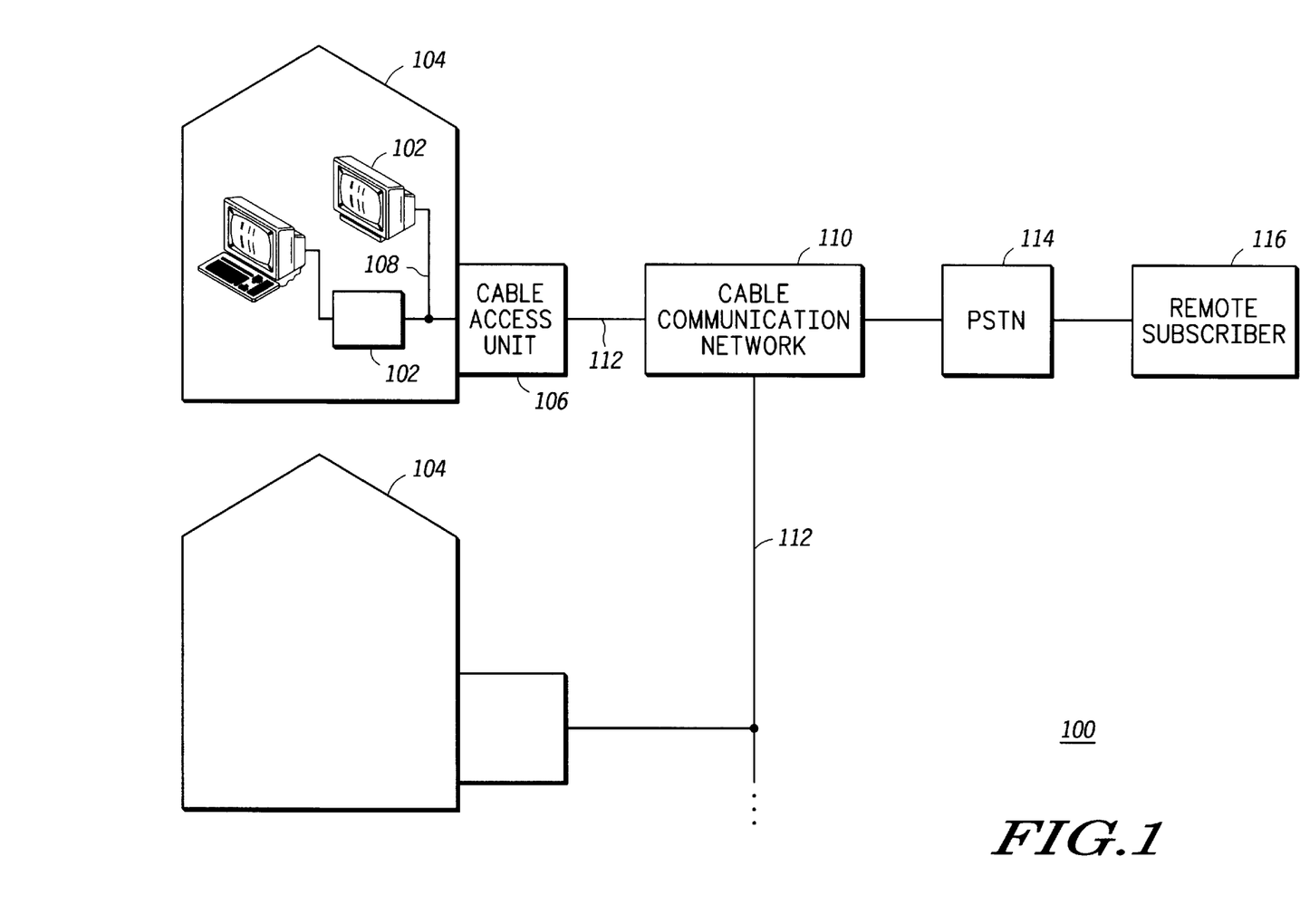
FIG. 1 is block diagram of a data communication system using a cable infrastructure.

A block diagram of a communication system 100 is shown in FIG. 1. A customer premise device 102, located in a customer premise 104, transmits a signal to the cable access unit 106 through a cable such as coaxial cable 108. The customer premise device 102 is a data modem in the preferred embodiment of the invention but may be a facsimile machine, video phone, telephone or other any other communication device for communication over a cable. In the preferred embodiment of the invention, the cable access unit 106 is a device for coupling various customer premise devices (104) to the cable communication network 100 and contains several circuits including a transceiver, memory devices, switches, couplers, and detectors. The cable access unit 106 detects the signal and connects the customer premise device 102 to the cable communication network 110 through a network cable 112. The cable communication network is coupled to a Public Switched Telephone Network (PSTN) 114 through which a communication link is established with a remote subscriber 116. Circuitry in the cable access unit 106 needed for upstream transmission is not powered until the cable access unit 106 detects that the customer premise device 102 is transmitting data.

Figure 2:
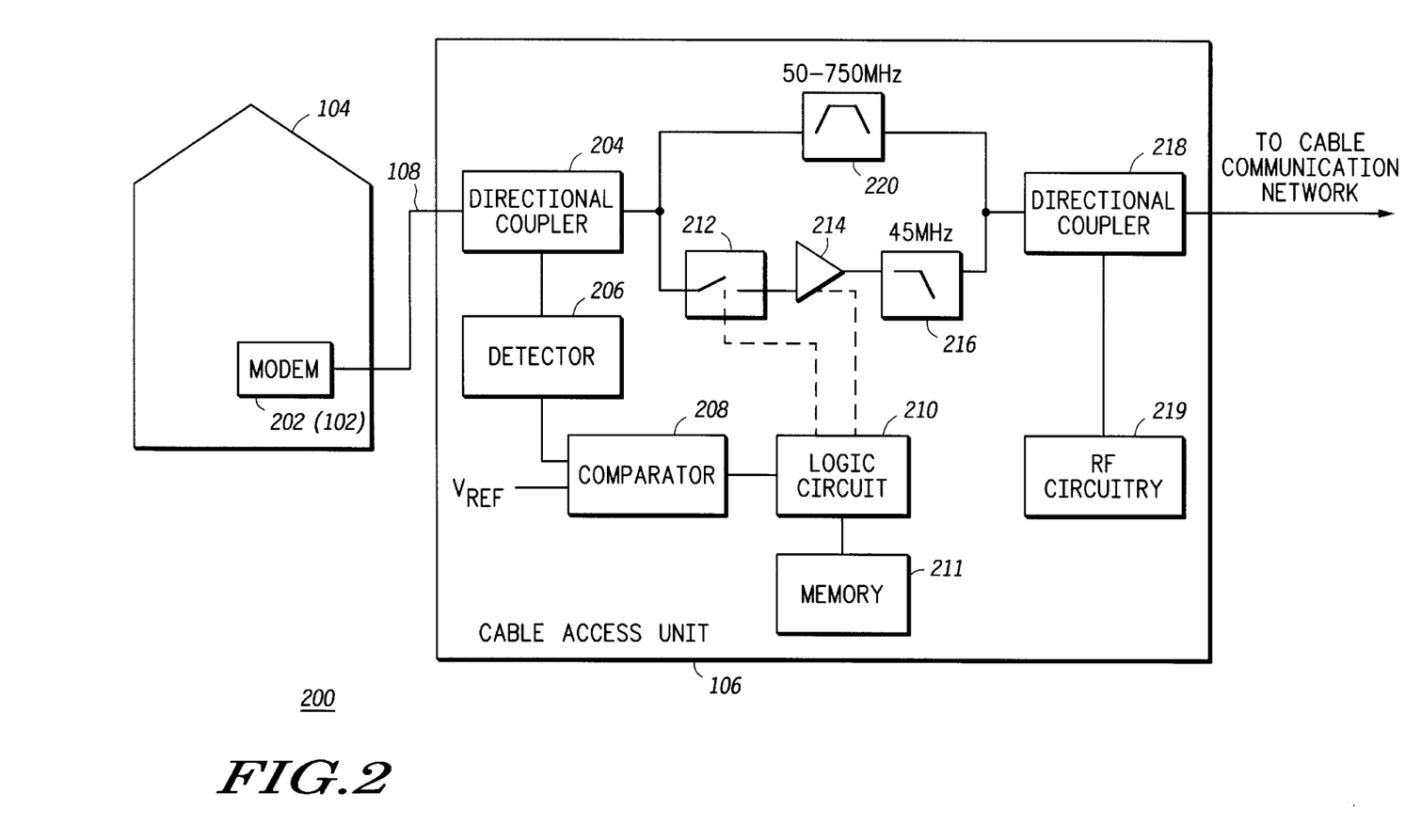
FIG. 2 is a block diagram of a cable communication system and a cable access unit in accordance with the preferred embodiment of the present invention.

A block diagram of a data communication system 200 used to transmit and receive data located at the local subscriber premise 104 and the cable access unit 106 according to the preferred embodiment of the present invention is shown in FIG. 2. A customer premise device 102 such as a modem 202, located at the customer premise 104, attempts to communicate with the remote subscriber 116 by transmitting a signal. The signal is a radio frequency (RF) signal of at least one RF pulse (signal pulse), and typically a series of signal pulses, containing an initialization sequence used by the modem 202 to establish a communication link with the remote subscriber 116. The modem 202 sends the signal in the upstream frequency band through the coaxial cable 108 to the cable access unit 106. In the preferred embodiment, the coaxial cable 108 is typically an RF coaxial cable of the type typically used to route television signals throughout the customer premise 104. However, the coaxial cable 108 can be of any design and material compatible with the particular cable communication system 200.

In the preferred embodiment, the cable access unit 106 is mounted to the side of the subscriber premise 104 similar to a telephone box. However, the cable access unit 106 may also be installed within the subscriber premise 104. For example the cable access unit 106 may be mounted on a basement wall of the subscriber premise 104.

The RF signal travels from the customer premise device 102 through a directional coupler 204 in the cable access unit 106 to a detector 206. The directional coupler 204 is of the type typically used in RF communication systems and designed to function in the particular cable communication system 200 using known techniques. In the preferred embodiment, the detector 206 is an RF detector. The detector 206 detects the RF pulse by rectifying the RF signal to produce a dc output which is provided to the comparator 208. The comparator 208 compares the dc output level to a reference voltage. In the preferred embodiment, the reference voltage is a fixed voltage chosen to be below the minimum threshold voltage that will be provided by the detector 206 when an RF pulse is transmitted by the modem 202. However, the reference voltage may be a dynamic value that changes depending on system parameters such as the level of noise.

If the voltage output of the detector 206 is above the minimum threshold voltage (reference voltage), the comparator 208 provides a voltage to the logic circuit 210 indicating a logic level of HIGH. Although the output of the comparator 208 indicates the presence of a signal above the reference voltage, noise with an amplitude higher than the reference voltage will also cause the comparator 208 to provide a HIGH output. Therefore, in the preferred embodiment of the invention, a logic circuit 210 is used to evaluate the characteristics of the signal pulse. As will be discussed in more detail with reference to FIG. 3, the logic circuit 210 determines if the modem 202 is sending a signal by comparing measured values to values stored in a memory device 211. When it determines that the modem is transmitting, the logic circuit 210 closes the ingress switch 212 which connects the modem 202 to the power amplifier 214. The logic circuit 210 continues to monitor the output of the comparator 208. If the output of comparator 208 is a logic level LOW for an extended period of time (several minutes), the logic circuit 210 opens the ingress switch 212.

The logic circuit 210 may be used to turn on circuits 214 in the cable access unit 106 needed when the modem 202 is transmitting. The circuits 214 may include power amplifiers, phase lock loops, oscillators and frequency mixers depending on the type of modem and the particular cable communication system 200. The circuits 214, therefore, are turned on and draw power only after the logic circuit 210 has determined that the modem 202 is transmitting. Otherwise, the circuits 214 are off and do not draw power.

After eliminating signals and noise above 45 MHz in the low pass filter 216, the signals are routed through a second directional coupler 218. The directional coupler 218 isolates the modem 202 from the RF circuitry 219 of the cable access unit 106 but allows signals between the cable communication network 200 and the modem 202 to pass with minimal attenuation. The signals are then routed through the cable communication network 110 to the PSTN 114 (FIG. 1). The modem continues to attempt to establish a communication link with the remote subscriber 116 by resending the initializing signals until the link is established.

Downstream signals pass through the second directional coupler 218 from the cable communication network 110 to a bandpass filter 220. The bandpass filter 220 allows only signals in the downstream frequency band to pass to the directional coupler 204. The downstream signals pass through the directional coupler 204 and into the subscriber premise 104 and are received by the modem 202 and other customer premise devices 102.

Figure 3:
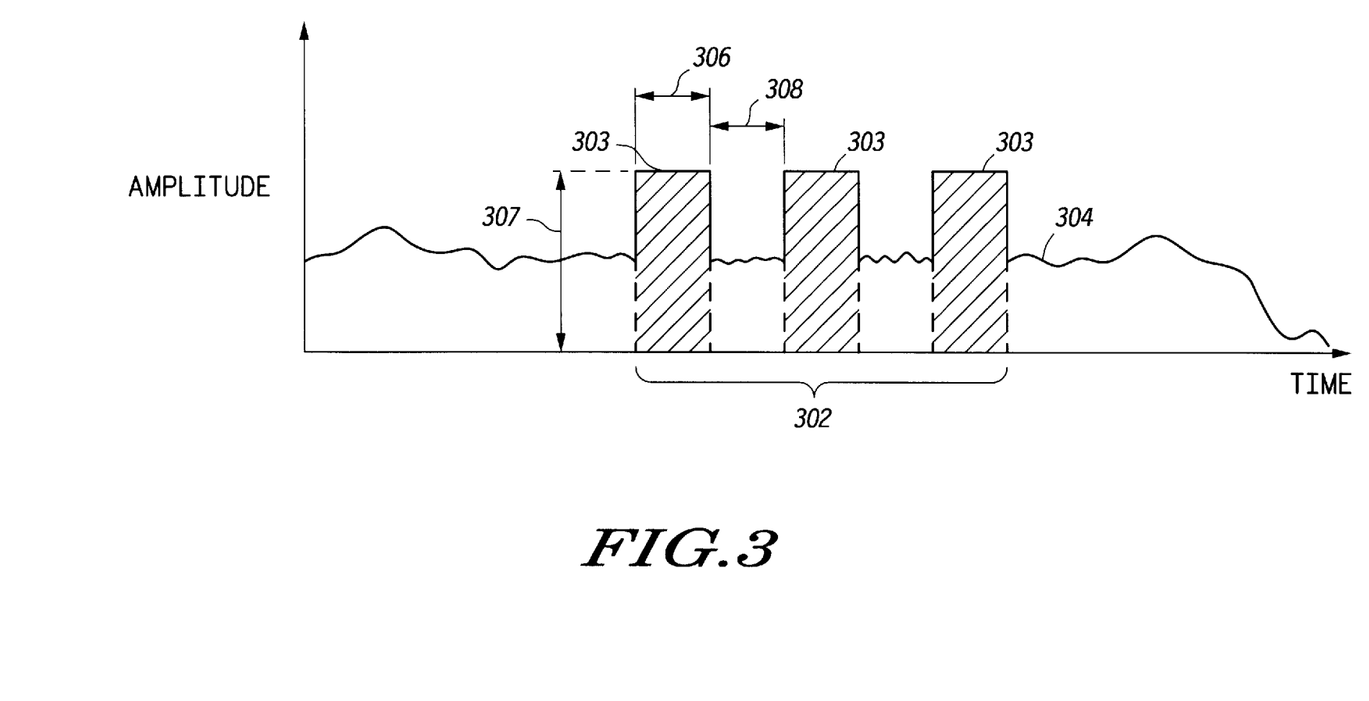
FIG. 3 is a drawing of the upstream frequency spectrum.

FIG. 3 is a drawing of a signal 302 (cross hatched area) transmitted by the modem 202 according to the preferred embodiment of the invention and ingress noise 304. The signal 302 consists of a plurality of signal pulses (303) having a duration 306 and separated by a time interval 308. Each signal pulse 303 is characterized by having a local maximum amplitude 307. The local maximum amplitude 307 may be different for each signal pulse 303. In the preferred embodiment of the invention, the logic circuit 210 compares the duration 306 and the time interval 308 of the signal pulses (303) to duration and time interval values stored in the memory device 211. If the respective values are the same, the logic circuit 210 determines that the modem 202 is transmitting and closes the ingress switch 212. The cable access unit 106 keeps the ingress switch 212 closed until a predetermined time has lapsed since a signal has been detected.

Figure 4:
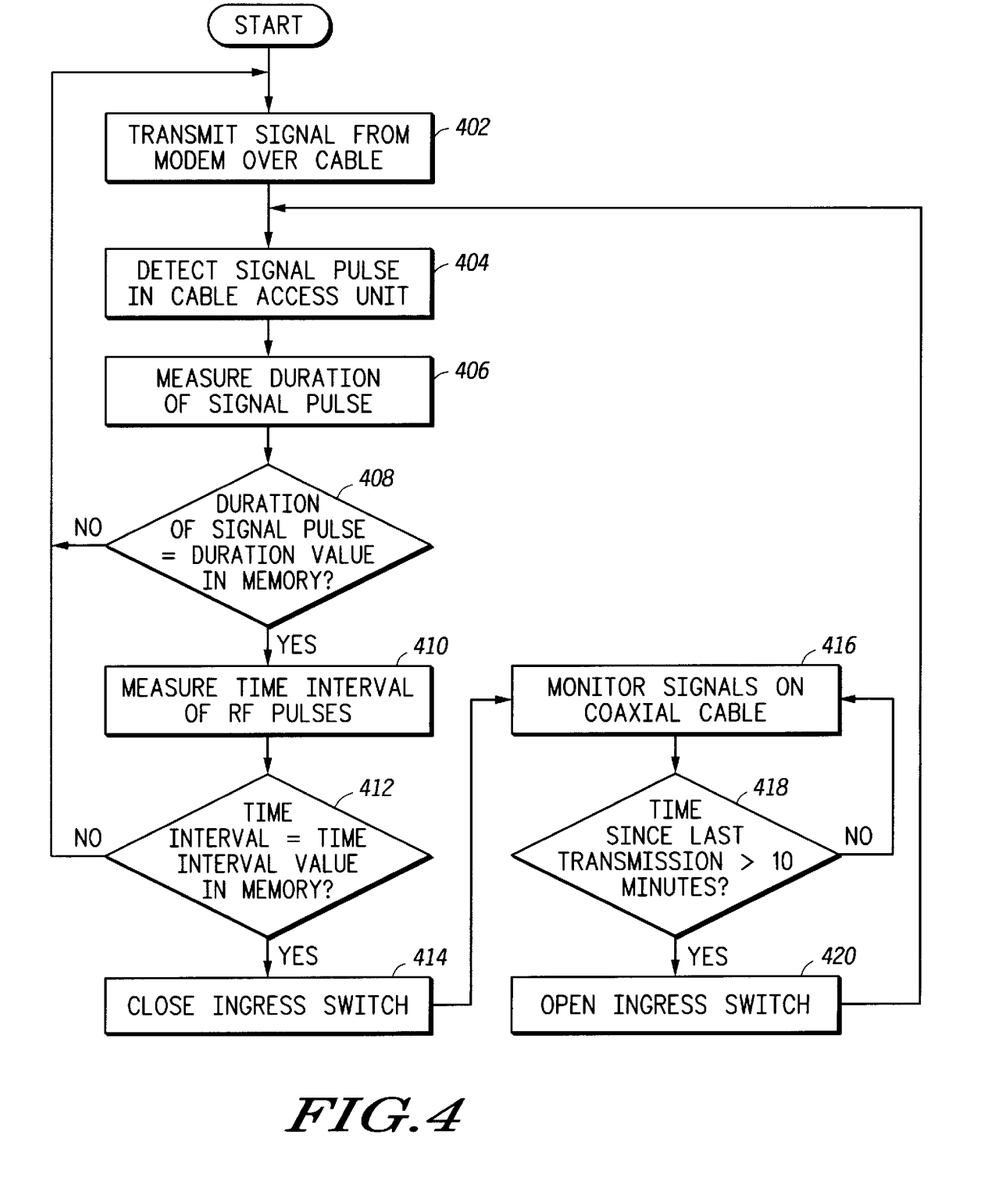
FIG. 4 is a flow chart in accordance with the preferred embodiment of the present invention.

FIG. 4 is a flow chart of the method of ingress noise reduction in accordance with the preferred embodiment of the present invention. At step 402, the modem transmits the signal 302 over the coaxial cable in order to establish a communication link with a remote subscriber 116. The detector 206 in the cable access unit 106 detects the signal 302 at step 404. At step 406, the logic circuit 210 determines the shape of the signal pulse 303 from the output of the comparator 208 and measures the signal pulse 303 by determining the amount of time between the rising and falling edges of the signal pulse 303 using known techniques. At step 408, the logic circuit determines if the measured pulse duration 306 is the same as the pulse duration associated with the modem 202 which is stored in the memory device 211. If the measured duration 306 is equal to the pulse duration value, the procedure continues at step 410. If the measured pulse duration 306 is not the same as the pulse duration value the procedure returns to step 402. At step 410, the logic circuit 210 measures the time interval 308 between signal pulses (303). At step 412, the logic circuit 210 determines if the measured time interval 308 is the same as the time interval value associated with the modem 202 stored in the memory device 211. If the measured time interval 308 is not the same as the stored value, the procedure returns to step 402. If the measured time interval 308 is the same as the stored time interval value, the procedure continues at step 414. At step 414, the logic circuit 210 closes the ingress switch 212. The cable access unit 106 continues to monitor the signals on the coaxial cable 108 at step 416. The logic circuit 210 determines if the time elapsed since the last HIGH level produced by the comparator 208 is greater than 10 minutes. If the time is less than 10 minutes the procedure returns to step 416. If the time is greater than 10 minutes, the procedure continues at step 420. At step 420, the logic circuit 210 opens the ingress switch 212 and returns to step 404 to monitor signals.

Therefore, in the preferred embodiment of the invention, the cable access unit 106 monitors the coaxial cable 108 for an RF signal transmitted by the modem 202. When the signal is detected, a comparison is made between the signal characteristics and the known signal characteristics of the modem 202 that are stored in the memory device 211. If the characteristics match, the logic circuit 210 closes the ingress switch to allow the modem 206 to connect to the cable communication network 200. The cable access unit 106 continues to monitor the coaxial cable 108 for RF signals and when an absence of the signal (no signal) is detected for an extended period of time, the ingress switch is opened to disconnect the coaxial cable 108 from the cable communication network 110.

In an alternate embodiment of the present invention, the modem 202 transmits a dc signal to the cable access unit 106 in order to establish a communication link with the remote subscriber 116. The dc signal is sent through the center conductor of the RF coaxial cable 108. The dc signal is then filtered and detected at the cable access unit 106. The cable access unit 106 responds to the detected dc signal by closing the ingress switch 212.

Figure 5:
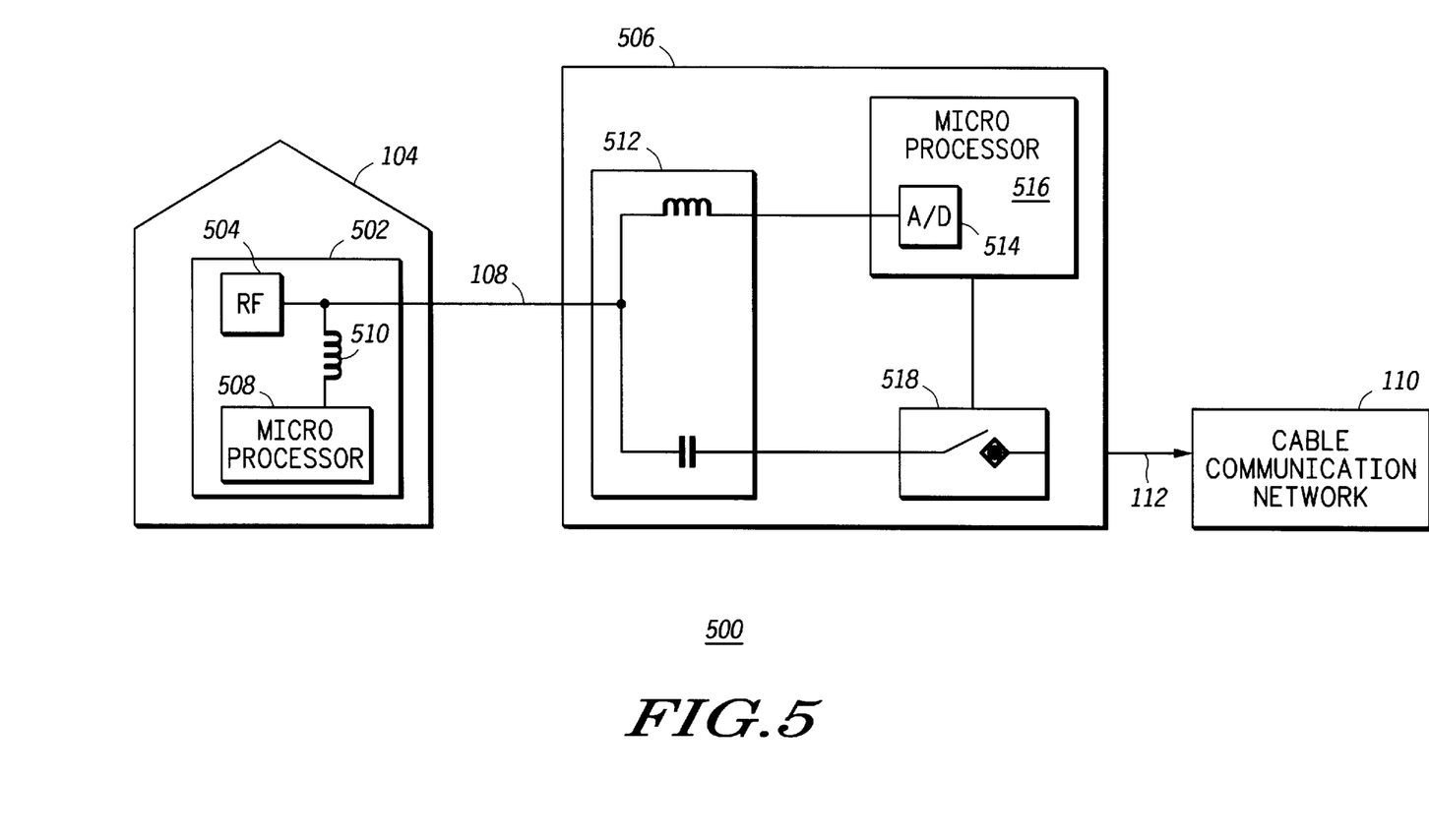
FIG. 5 is a block diagram of a cable communication system, a modem, and a cable access unit in accordance with an alternate embodiment of the present invention.

A block diagram of a cable communication system 500, a modem 502, and cable access unit 506 according to an alternate embodiment of the present invention is shown in FIG. 5. A modem microprocessor 508, located in the modem 502, is coupled to the coaxial cable 108 through a radio frequency (RF)choke 510. The RF choke 510 allows dc signals to pass to the coaxial cable 108 while blocking higher frequencies. When the modem 502 begins to transmit RF data signals from the RF circuit 504, the modem microprocessor 508 sends a dc signal to a cable access unit 506 over the center conductor of the coaxial cable 108. The RF circuit is of the type used in RF data modems to transmit data and known by those skilled in the art. A filter 512 separates the dc signal for the RF signals. The dc signal is passed to a detector (514) which is an analog to digital converter (A/D converter) 514 in the microprocessor 516. The microprocessor 516, upon receiving an indication from the A/D converter 514 that a dc signal is present, closes the ingress switch 518. When the ingress switch 518 is closed, the RF signals pass through the filter 512, through the ingress switch 518, onto the cable 112, and to the cable communication network 110. Once the connection is made, the microprocessor 518 continues to monitor the signals on the coaxial cable 108 through the A/D/converter 514. If an absence of the dc signal (no dc signal) is detected for a predetermined time the ingress switch is opened to disconnect the coaxial cable 108 from the cable communication network 110.

Figure 6:
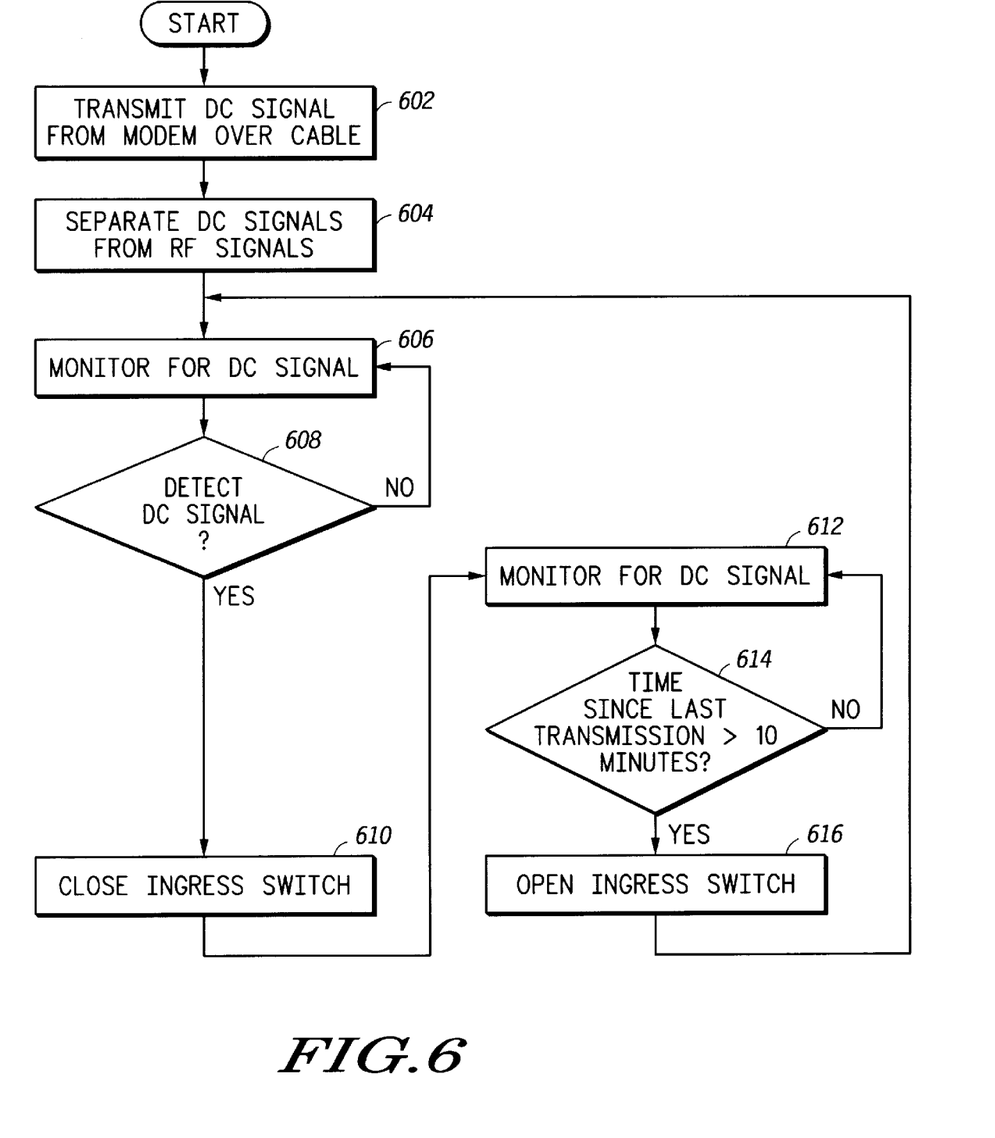
FIG. 6 is a flow chart in accordance with an alternate embodiment of the present invention.

FIG. 6 is a flow chart of a method of ingress noise reduction in accordance with an alternate embodiment of the invention. At step 602, the modem 502 transmits a dc signal, in addition to RF data signals, to the cable access unit 506. A filter 512 in a cable access unit 506 separates the RF signals from the dc signals at step 604. At step 606, the A/D converter 514 converts the low frequency analog output from the filter 512 to a digital signal. A HIGH logic level produced by the A/D converter 514 indicates to the microprocessor 516 that a dc signal has been detected. If, at step 608, it is determined that the dc has been detected, the procedure continues with step 610. If an absence of dc signal is detected, the procedure returns to step 606 to continue monitoring for a dc signal. At step 610, the microprocessor 516 closes the ingress switch 518 which results in connecting the modem 502 to the cable communication network 110. At step 612, the cable access unit 506 continues to monitor the coaxial cable 108 for the dc signal. If it is determined, at step 614, that no dc signal has been present for a predetermined period of time, 10 minutes for example, the procedure continues to step 616. If the dc signal is still present or the time since it has last been present is less than the predetermined time, the procedure returns to step 612 to continue monitoring the dc signal. At step 616 the ingress switch 518 is opened thereby disconnecting the modem 502 from the cable communication network 110. The procedure then returns to step 606 to monitor for the next dc signal.

Briefly summarizing the method of the alternate embodiment, the cable access unit 506 monitors the coaxial cable 108 for a dc signal. The modem 502 injects a dc signal onto the center conductor of the coaxial cable 108 when it begins to transmit data. When the cable access unit 506 detects the dc signal, the ingress switch 518 is closed allowing the modem 502 to communicate on the cable communication network 100. After the ingress switch is closed, the cable access unit 506 continues to monitor the dc signal. If the signal is absent for a predetermined time which indicates that the modem 502 has not been transmitting for that time, the ingress switch is opened and the coaxial cable 108 disconnected from the cable communication network 110.

Therefore, the present invention reduces the level of ingress noise 304 in the upstream frequency band by not allowing signals generated in the customer premise to enter the upstream frequency band on the network unless a customer premise device is attempting to establish a communication link. In the preferred embodiment, an RF detector monitors the signals on the coaxial cable 108 for an RF signal. The comparator indicates to the logic circuit when the RF signal has exceeded a minimum threshold. The logic circuit determines if the modem is attempting to establish a communication link. If the modem is transmitting, the logic circuit closes the ingress switch to connect the modem to the network.

To reduce power consumption, the logic circuit turns on circuits that are needed for the modem to establish the communication link when the modem is transmitting and turns the circuits off after an extended time of no signal detection.

We claim:

1. A method comprising the steps of:

transmitting a signal over a cable from a customer premise device;

detecting the signal at a cable access unit connected to the cable by determining that an amplitude of the signal crosses a threshold;

connecting the customer premise device to a network when the signal crosses the threshold; and powering of a transmitter in response to the step of detecting the signal.

2. A method according to claim 1 wherein the step of connecting the customer premise device to the network includes providing power to a circuit coupled to the cable and coupled to the network.

3. A method according to claim 1 wherein the step of detecting the signal includes detecting a dc signal transmitted from the customer premise device.

4. A method according to claim 3 wherein the step of transmitting a signal over a cable from a customer premise device includes injecting a dc signal onto the cable.

5. A method according to claim 1 wherein the step of detecting the signal includes the steps of:

detecting a plurality of local maximum amplitudes of the signal;

measuring a first plurality of time intervals between the plurality of local maximum amplitudes; and determining that the first plurality of time intervals are equal to a second plurality of time intervals associated with the customer premise device.

6. A method according to claim 5 wherein the second plurality of time intervals are determined by learning the first plurality of time intervals.

7. A method according to claim 1 further comprising the steps of:

detecting an absence of the signal; and disconnecting the customer premise device from the network.

8. A method comprising the steps of:

transmitting an RF signal from a customer premise device to a cable access unit over a cable;

detecting a plurality of maximum amplitudes of the RF signal;

measuring at least a first time interval between the plurality of maximum amplitudes;

determining that the first time interval is equal to a second time interval stored in a memory associated with the customer premise device; and selectively connecting the customer premise device to a network through the cable in response to the step of determining.

9. A method comprising the step of:

transmitting a signal from a customer premise device to a cable access unit over a cable;

detecting a signal pulse;

measuring a first duration of the signal pulse;

determining that the first duration is equal to a second duration associated with the customer premise device and stored in memory; and selectively connecting the customer premise device to a network through the cable in response to the step of determining.

10. A cable access unit comprising:

a detector for detecting a signal crossing a threshold sent by a customer premise device over a cable;

a device having a transmitter, for coupling to the cable and responsive to the detector by connecting the customer premise device to a network when the detector detects the signal crossing of the threshold; and the transmitter being powered upon the detector detecting the signal crossing the threshold.

11. A cable access unit according to claim 10 wherein the detector is for determining that an amplitude of the signal is above a minimum threshold.

12. A cable access unit according to claim 10 wherein the detector is an analog to digital converter.

13. A cable access unit according to claim 10 further comprising:

a logic circuit for measuring a first plurality of time intervals between a plurality of local maximum amplitudes of a signal and determining that the first plurality of time intervals are equal to a second plurality of time intervals associated with the customer premise device;

a memory device for storing the second plurality of time intervals; and the detector for detecting the plurality of local maximum amplitudes of the signal.

14. A cable access unit according to claim 13 wherein the second plurality of time intervals are determined by learning the first plurality of time intervals in the logic circuit.

15. A cable access unit according to claim 10 further comprising:

a logic circuit for measuring a first duration of a signal pulse and determining that the first duration is equal to a second duration associated with the customer premise device;

a memory device for storing the second duration; and the detector for detecting the signal pulse.

16. A cable access unit according to claim 10 wherein the detector is for detecting an absence of the signal and the device is responsive to the detector by disconnecting the customer premise device from the network.

17. A cable access unit for a network comprising:

a detector for detecting a plurality of maximum amplitudes of a signal transmitted by a customer premise device over a cable;

a logic circuit for measuring at least a first time interval between the plurality of maximum amplitudes and determining that the at least first time interval is equal to a second time interval associated with the customer premise device;

a memory device coupled to the logic circuit for storing the second time interval; and a device responsive to the logic circuit for selectively coupling the customer premise device to the network.

18. A cable access unit for a network comprising:

a detector for detecting a signal pulse transmitted by a customer premise device over a cable;

a logic circuit for measuring a first duration of the signal pulse and determining that the first duration is equal to a second duration associated with the customer premise device;

a memory device coupled to the logic circuit for storing the second duration; and a device coupleable to the cable and responsive to the logic circuit for selectively connecting the customer premise device to the network.

19. A cable access unit for a network comprising:

a detector for detecting a signal pulse transmitted by a customer premise device over a cable;

a logic circuit for measuring a first duration of the signal pulse and determining that the first duration is equal to a second duration associated with the customer premise device;

a memory device coupled to the logic circuit for storing the second duration; and a device having a transmitter, coupleable to the cable and responsive to the logic circuit for selectively connecting the customer premise device to the network and powering the transmitter.

* * * * *